US009898264B2

(12) United States Patent
Li et al.

(10) Patent No.: US 9,898,264 B2
(45) Date of Patent: Feb. 20, 2018

(54) AUTOMATIC COMPONENTIZATION ENGINE

(71) Applicant: SuccessFactors, Inc., South San Francisco, CA (US)

(72) Inventors: Yuan Li, Shanghai (CN); Yijun Jiang, Shanghai (CN)

(73) Assignee: SUCCESSFACTORS, INC., South San Francisco, CA (US)

( * ) Notice: Subject to any disclaimer, the term of this patent is extended or adjusted under 35 U.S.C. 154(b) by 289 days.

(21) Appl. No.: 14/572,809

(22) Filed: Dec. 17, 2014

(65) Prior Publication Data

US 2016/0179483 A1    Jun. 23, 2016

(51) Int. Cl.
*G06F 17/30* (2006.01)
*G06F 9/44* (2006.01)

(52) U.S. Cl.
CPC ............ *G06F 8/38* (2013.01); *G06F 17/3089* (2013.01)

(58) Field of Classification Search
CPC ......... G06F 17/30867; G06F 17/30864; G06F 17/30873; G06F 8/37; G06F 8/34; G06F 8/61; G06F 8/65; G06F 9/45516; G06F 8/30; G06F 8/38; G06F 8/40; G06F 8/41; G06F 8/43; G06F 8/427; G06F 17/30345; G06F 17/30569; G06F 17/3089; G06F 17/30893; G06F 8/4143
USPC ............... 707/609, 628, 637, 709, 803, 821; 717/168, 171, 172, 173, 174, 176, 177, 717/178, 106, 107, 120, 122, 136, 140, 717/141, 143, 148, 118, 147, 161; 715/234, 239
See application file for complete search history.

(56) References Cited

U.S. PATENT DOCUMENTS

| 5,919,247 | A  | * | 7/1999  | Van Hoff  | G06F 8/61     |
|           |    |   |         |           | 707/999.201   |
| 6,073,163 | A  | * | 6/2000  | Clark     | G06F 9/4443   |
|           |    |   |         |           | 709/203       |
| 7,665,061 | B2 | * | 2/2010  | Kothari   | G06F 8/30     |
|           |    |   |         |           | 715/760       |
| 7,668,870 | B1 | * | 2/2010  | Sykes     | G06F 17/3089  |
|           |    |   |         |           | 707/690       |
| 9,483,259 | B1 | * | 11/2016 | Lee       | G06F 8/30     |
| 2001/0011275 | A1 | * | 8/2001 | Lin     | G06F 17/3089  |
| 2004/0039795 | A1 | * | 2/2004 | Percival | G06F 17/3089  |
|           |    |   |         |           | 709/218       |
| 2007/0136417 | A1 | * | 6/2007 | Kreiner | G06F 17/30873 |
|           |    |   |         |           | 709/203       |
| 2007/0174324 | A1 | * | 7/2007 | Palapudi | G06F 17/3089  |

(Continued)

OTHER PUBLICATIONS

Varshney et al., A Novel Architecture and Algorithm for Web Page Change Detection, 2013 3rd IEEE International Advance Computing Conference (IACC), Year: 2013, pp. 782-787.*

*Primary Examiner* — Greta L Robinson
(74) *Attorney, Agent, or Firm* — Fountainhead Law Group, P.C.

(57) ABSTRACT

Disclosed herein are technologies for automatically updating object model and associated code for software applications, such as web pages, by invoking an automatic componentization engine client to determine changes in the component code of web pages, receiving the changes in the component code, and compiling and verifying the code. Generated or revised and updated code may then be provided to a user.

15 Claims, 8 Drawing Sheets

(56) References Cited

U.S. PATENT DOCUMENTS

| | | | |
|---|---|---|---|
| 2010/0138722 A1* | 6/2010 | Harley | H03M 13/333 |
| | | | 714/762 |
| 2012/0150662 A1* | 6/2012 | Hannon | G06Q 30/0277 |
| | | | 705/14.73 |
| 2013/0117645 A1* | 5/2013 | Butlin | G06F 17/3089 |
| | | | 715/205 |
| 2014/0046980 A1* | 2/2014 | Kleinschmidt | G06F 17/30896 |
| | | | 707/793 |
| 2014/0245258 A1* | 8/2014 | Frenkiel | G06F 8/51 |
| | | | 717/120 |

\* cited by examiner

Jenkins

Jenkins ▸ ACE_JOB ▸ configuration

- Back to Dashboard
- Status
- Changes
- Workspace
- Build Now
- Delete Project
- Configure

Build History    trend
RSS for all   RSS for failures

Search

Project Name   ACE_JOB

Description
This is a periodical jenkins job to trigger the ACE process to meet CI:
1. trigger ACE client.
2. compile and build all of the code w/ the generated ACE page component code.
3. check in the code in the main branch if build succeed.
4. if build is broken, check in the code in one branch to wait for module owner manually check the failure cause.
5. send email notification.
[Escaped HTML] Preview ☐ Discard Old Builds
☐ This build is parameterized
☐ Disable Build (No new builds will be executed until the project is re-enabled)
☐ Execute concurrent builds if necessary

Advanced Project Options                                                Advanced...

Source Code Management

○ None
○ CVS
○ CVS Projectset
● Subversion

Modules

Repository URL          https://svn.successfactors.com/repos/build-system/trunk

Local module directory (optional)

Repository depth        infinity ▼

Ignore externals   ☐

Add more locations...

*Fig. 5*

Execute shell

Command  ./checkInCode. sh

See the list of available environment variables

Delete

Add build step ▶

Post-build Actions

E-mail Notification

Recipients  Li Yuan

Whitespace-separated list of recipient addresses. May reference build parameters like $PARAM. E-mail will be sent when a build fails, becomes unstable or returns to stable.

☑ Send e-mail for every unstable build

☐ Send separate e-mails to individuals who broke the build

Delete

Add post-build action ▶

Fig. 7

AUTOMATIC COMPONENTIZATION ENGINE

TECHNICAL FIELD

The present disclosure relates generally to generating and updating code modules of applications.

BACKGROUND

Applications, such as web pages have certain functionality associated with them in the form of software code-oriented components. For example, a web page may have buttons to activate functions as such as an input box, click through button, drop down list, etc.

In certain cases, the components are modularized. For example, a login page may have components for a user name box, a password box, and login button that is modularized and has object-oriented code or program. A developer or user that maintains the web page has knowledge that such codes or programs exist for the components, and may have access to such code; however, in certain instances, the web page may change and particularly the components and modules that are associated with the web page. The user is not made aware of such changes.

SUMMARY

Disclosed herein are technologies for automatically updating object model and associated code for software applications, such as web pages, by invoking an automatic componentization engine client to determine changes in the component code of web pages, receiving the changes in the component code, and compiling and verifying the code. Therefore, generated or revised and updated code may then be provided to a user.

With these and other advantages and features that will become hereinafter apparent, further information may be obtained by reference to the following detailed description and appended claims, and to the figures attached hereto.

BRIEF DESCRIPTION OF THE DRAWINGS

FIG. 5 illustrates an exemplary screen shot for a job initializer to pull source code;

FIG. 7 illustrates an exemplary screen shot for checking code and sending notification.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are technologies for implementing automation for code modules related to applications such as web pages.

Figure 1:
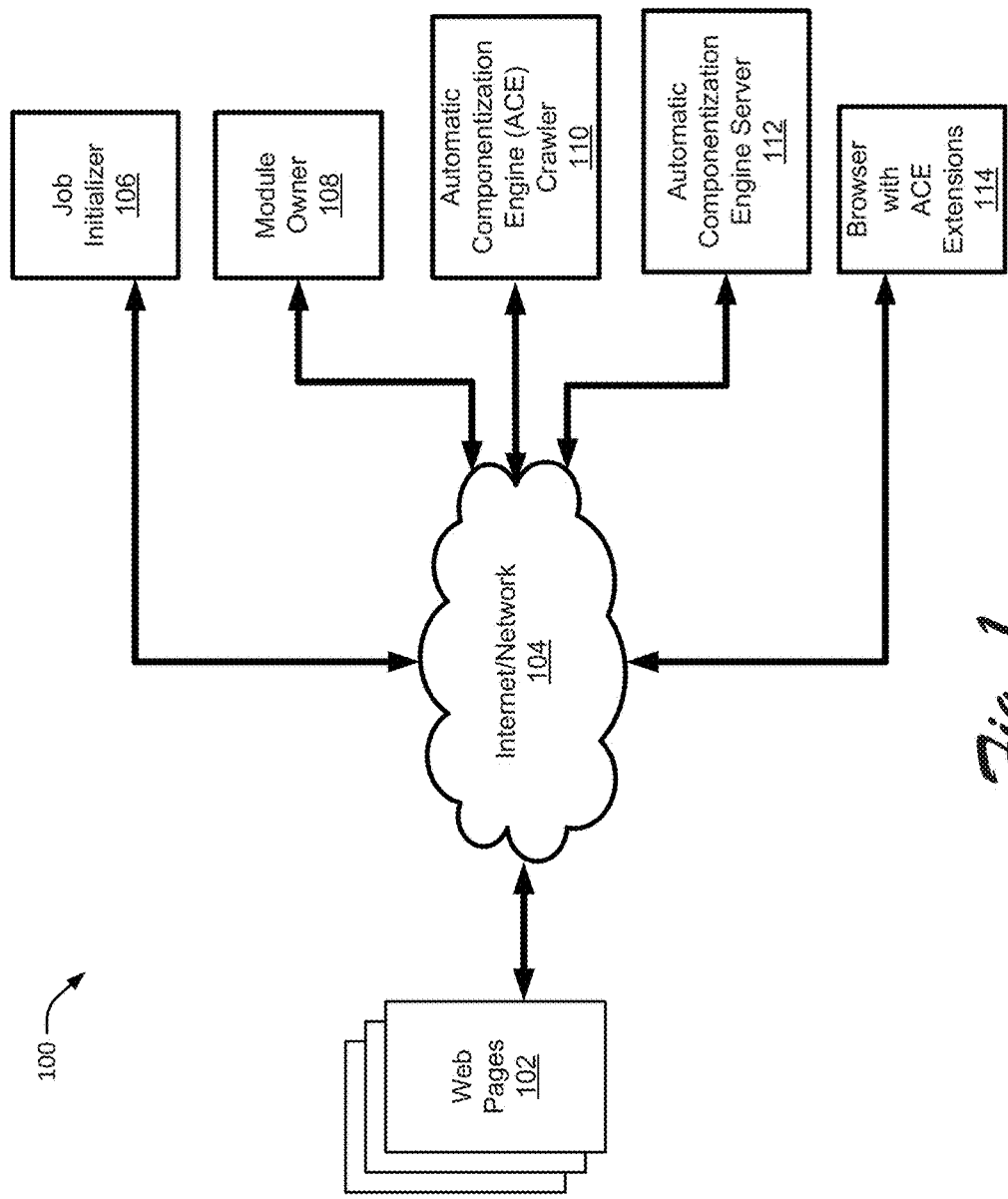
FIG. 1 illustrates an exemplary network or system.

FIG. 1 shows an example network or system 100 as described in the present implementations herein. It is to be understood, that system 100 may include other devices, components, entities and the like which are not shown in order to simplify the description.

System 100 includes applications, such as various web pages 102. The web pages may be developed and operational. A network or networks, such as the Internet 104 connects to the web pages 102. The network 104 is connected to various entities.

In this example, the network 104 connects to a job initializer 106. The job initializer 106, for example, may be a Jenkins Job. The job initializer 106 may provide for automatic and continuous run time of computer code or script. Typical applications of the job initializer 106 include maintenance of web pages.

The system 100 also includes module owner 108. The module owner 108 may be considered as a user that maintains the web pages 102. In one implementation, system 100 includes an automatic componentization engine (ACE) crawler 110. The ACE crawler 110 may reside in one or more various computing devices, including the "cloud." System 100 may also include an automatic componentization engine (ACE) server 112. The ACE server 112 may be one of the computing devices that host the ACE crawler 110. A browser 114 with automatic componentization engine (ACE) extensions may also be included in system 100.

It is to be understood that the entities that are described may be included or part of one another, or may be included with other entities, devices, computers, and the like. Furthermore, such entities may be implemented in various configurations, including for example hardware, firmware, software, cloud, and combinations thereof.

Figure 2:
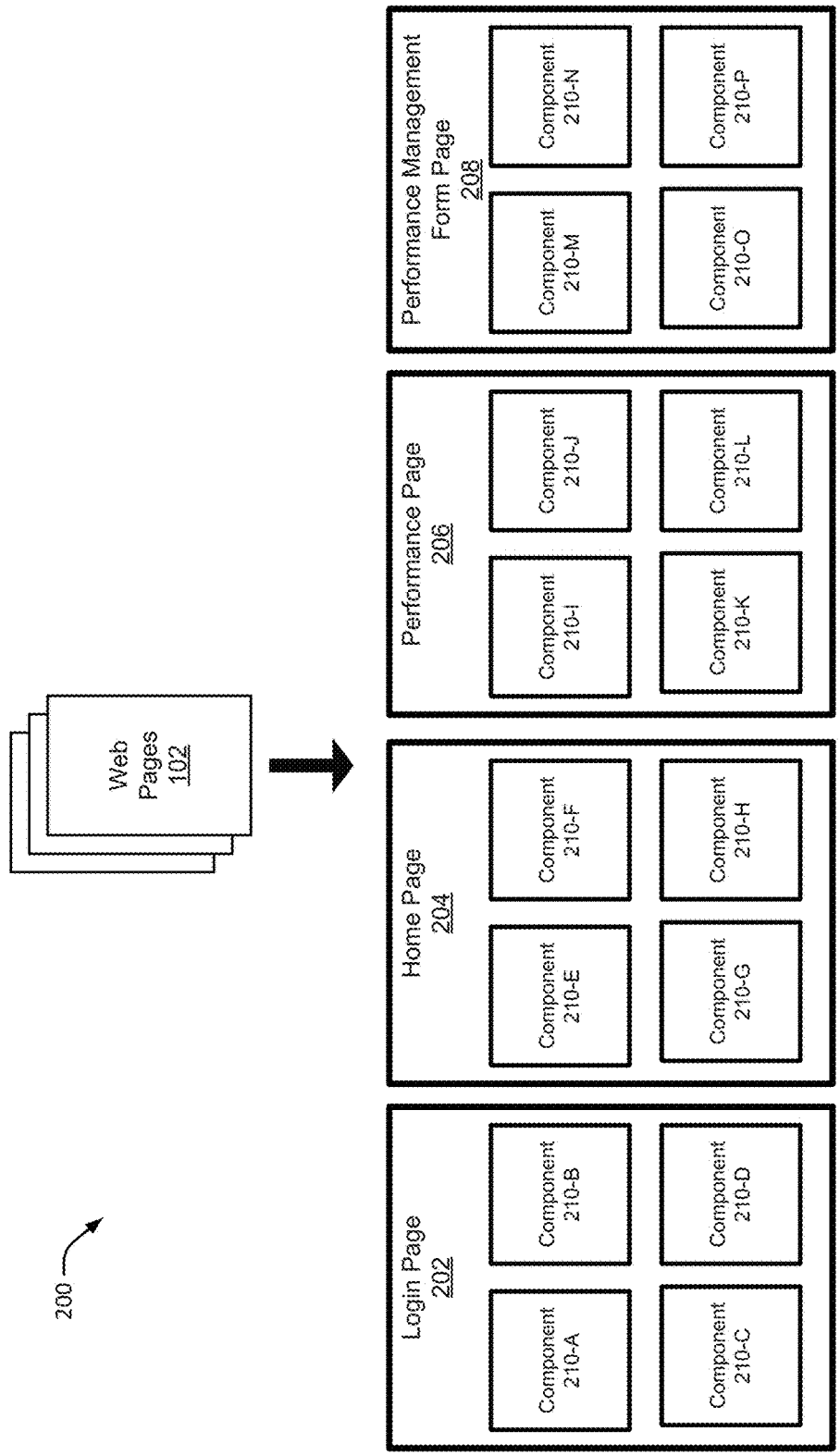
FIG. 2 illustrates exemplary web pages and components.

FIG. 2 shows exemplary web pages and components 200 as described in the present implementations herein. Web pages 102 may include various web pages. In this example, illustrated are a login page 202, a home page 204, a performance page 206 and a performance management form page 208. The login page 202, home page 204, performance page 206 and performance management form page 208 include particular modules or components 210. The web pages and components may be managed by the module owner 108 described above.

Figure 3:
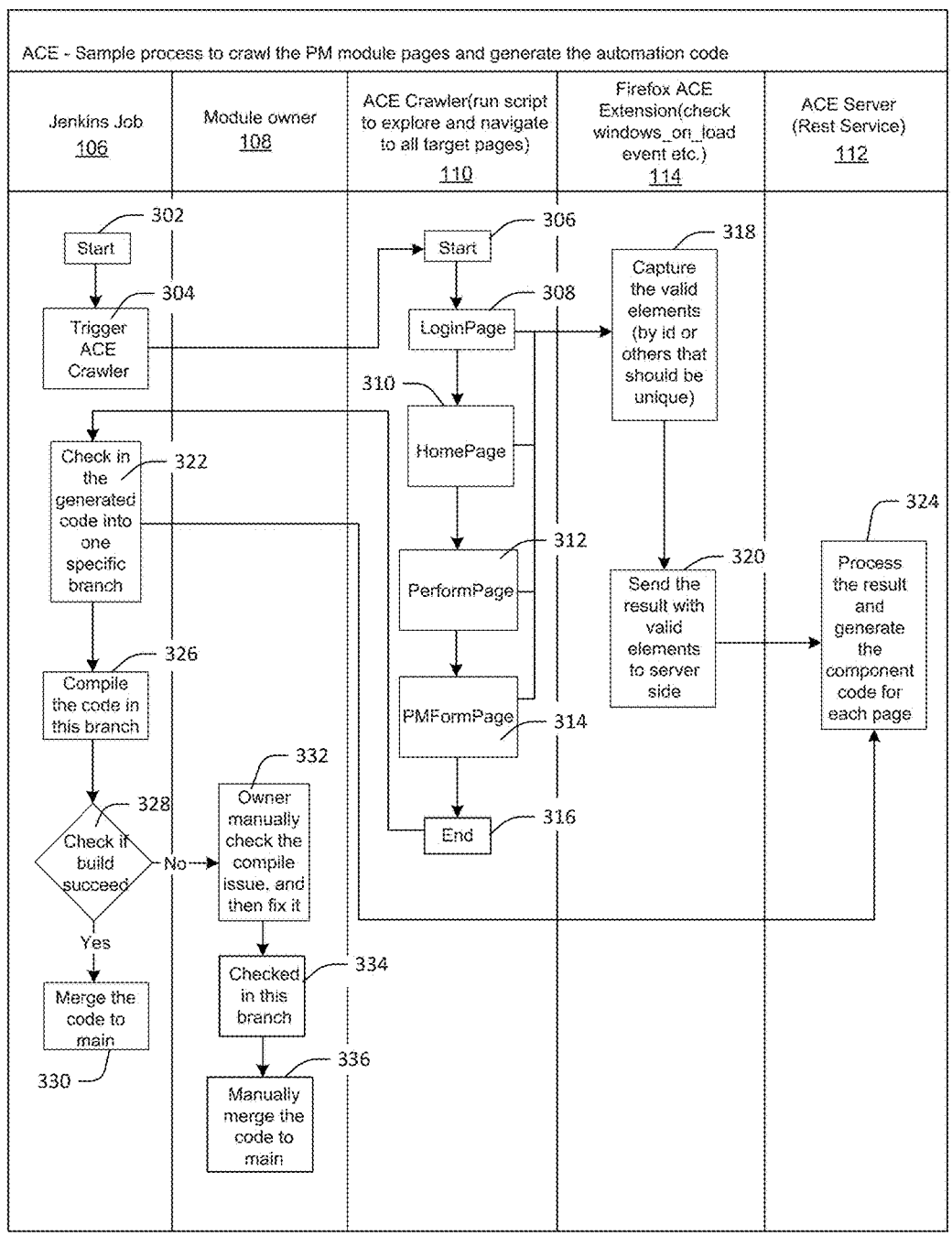
FIG. 3 illustrates an exemplary process flow to automatically generate or update code for applications.

FIG. 3 shows an exemplary process 300 for implementing, at least in part, the technology described herein. In particular, process 300 depicts a flow to automatically generate or update code for applications such as web pages. The process 300 may be performed by a computing device or devices. An example architecture of such computer devices is described below with reference to FIG. 8. In this particular example, the process 300 describes certain acts performed by certain entities as discussed above; however, as discussed such entities may be included with one another. In particular, the entities in this example are the job initializer 106, the module owner 108, the automatic componentization engine (ACE) crawler 110, the automatic componentization engine (ACE) server 112, and the browser with ACE Extension 114.

At 302, initialization or start of the process may be performed by the job initializer 106. As discussed, the job initializer may continuously perform running of script or code as part of its operations.

At 304, the ACE crawler 110 is triggered. Triggering may occur by a particular set of command or instruction per an occurring event or set time. In FIG. 3, ACE crawler 110 may run a script to explore and navigate to all targeted pages.

At 306, the ACE crawler begins to run script and check (or explore) various applications, and particularly web pages. In this example, steps 308, 310, 312 and 314 are respectively related to calling up a login page, home page, perform page, and performance management form page (e.g., login page 202, home page 204, performance page 206 and performance management form page 208).

At 316, the end of process for the ACE crawler is indicated.

At 318, the browser 114 captures the elements that are applicable to the web pages. In other words, the browser identifies the applicable modules or components, such as components 210 described above that are relevant to the web pages.

At 320, the browser sends the results with the valid or relevant elements (and their associate web pages) to the ACE server.

At 322, the job initializer retrieves the source code generated from the ACE server, and checks the generated code into a specific source code branch.

At 324, the ACE server 112 processes the results and generates component code for each of the web pages. In certain implementations, ACE server 112 parses the component code and based on keyword and identification (ID), transforms the component code to source code for each page component.

At 326, the job initializer compiles the code for each branch.

At 328, a check is performed to determine if the build (or compiling) is successful.

At 330, following the YES branch of 328, if the build is successful, the code is merged into the main script.

At 332, following the NO branch of 328, if the build is not successful, the module owner 108 may check the issue in the compiling and address the issue.

At 334, the branch of the generated code may be checked.

At 336, a manual merge of the code may be made with the main script.

Figure 4:
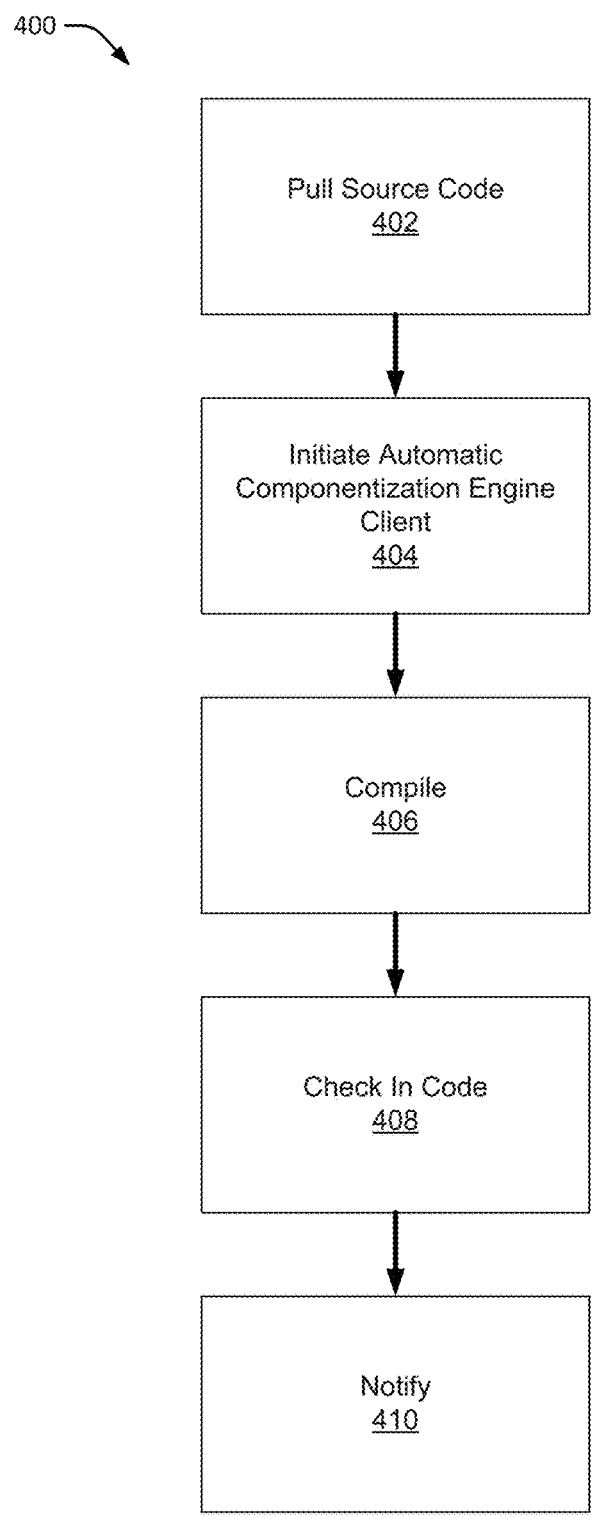
FIG. 4 illustrates an exemplary process for automatically generating or updating code for applications such as web pages.

FIG. 4 shows an exemplary process 400 for implementing, at least in part, the technology described herein. In particular, process 400 depicts a flow to automatically generate or update code for applications such as web pages. The process 400 may be performed by a computing device. An example architecture of such a computer device is described below with reference to FIG. 8. In this particular example, the process 400 describes certain acts performed by a job initializer, such as the job initializer 106 discussed above.

At 402, source code of web pages may be initiated and pulled. In particular, code related to the components or modules of the web pages may be pulled.

At 404, an automatic componentization engine (ACE) client or crawler is initiated. In particular, the ACE crawler is to explore and navigate through the targeted web pages.

At 406, a compile of the received code is performed as to the main script.

At 408, the code is checked to determine if the compile is successful.

At 410, an alert or notification may be made as to a user or module owner indicating that the code for the modules or components have been changed.

FIG. 5 shows an example screen shot 500 from a job initializer. In this example, a "Jenkins Job" is initialized to begin the process.

Figure 6:
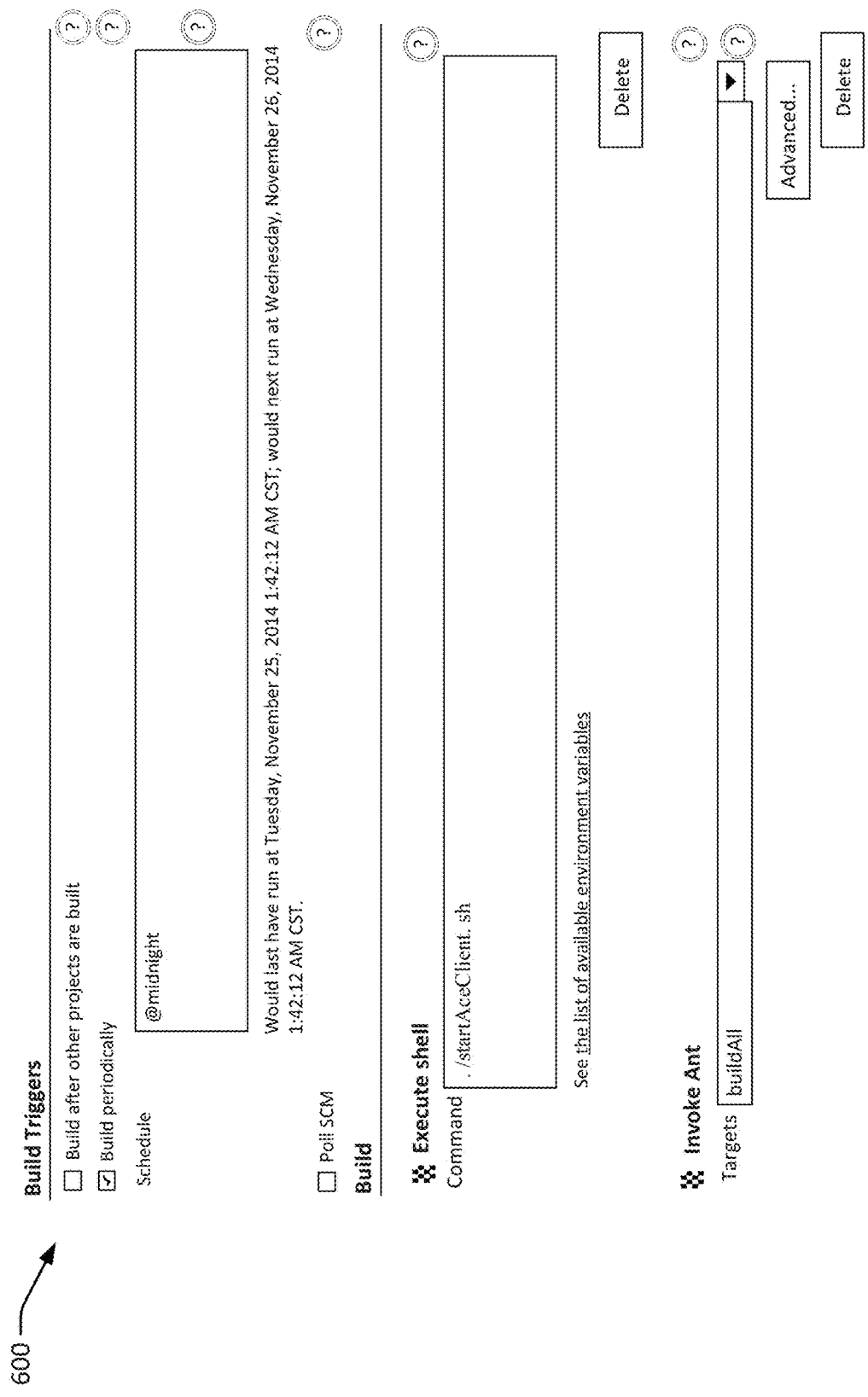
FIG. 6 illustrates an exemplary screen shot for initializing a crawler and compiling.

FIG. 6 shows an example screen shot 600 indicating that an automatic componentization engine (ACE) client or crawler has been initiated, and that compiling is taking place.

FIG. 7 shows an example screen shot 700 that the code is being checked, and notification made by email to the module owner is performed.

Figure 8:
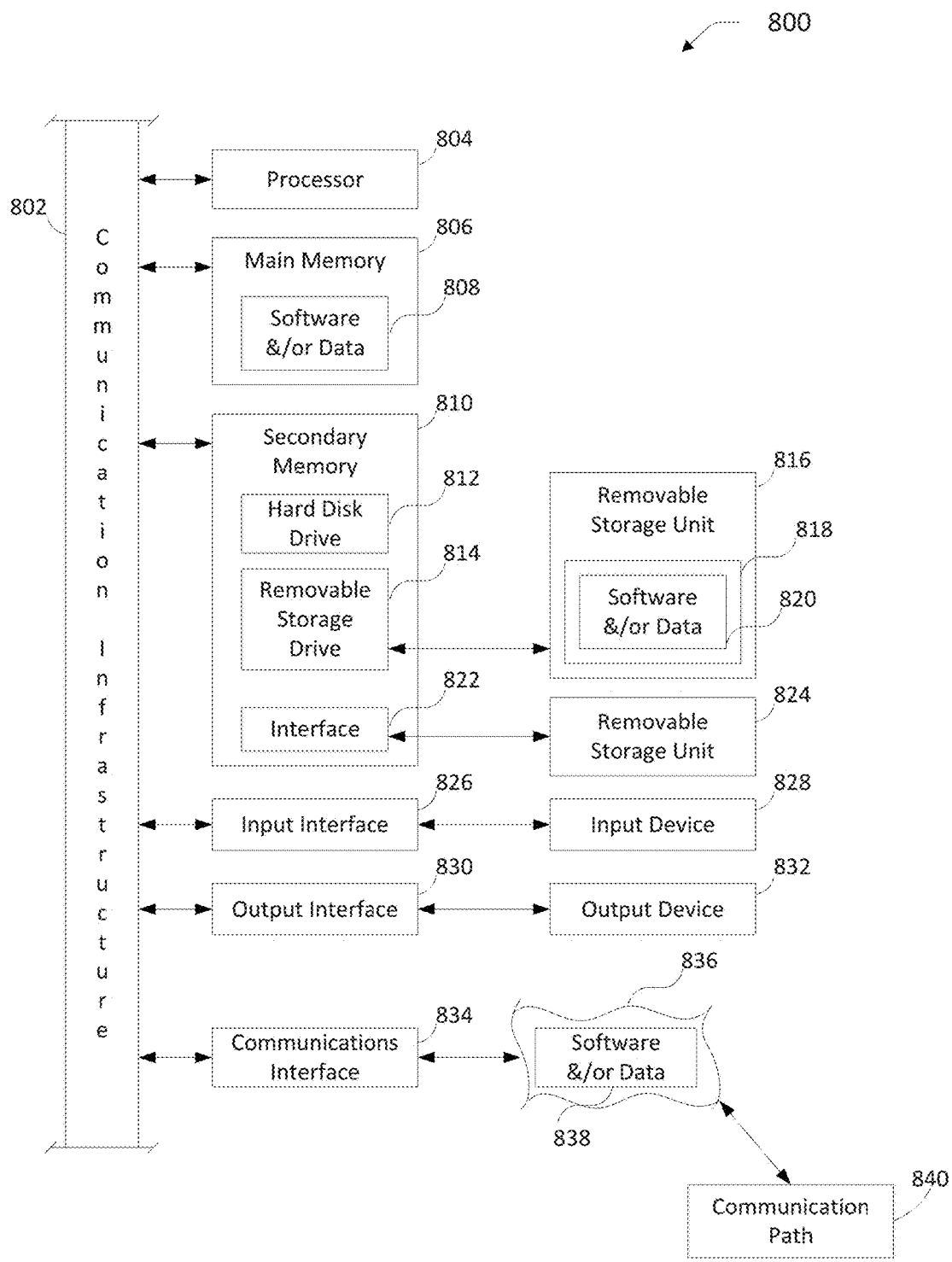
FIG. 8 illustrates an exemplary computing system to implement in accordance with the technologies described herein.

FIG. 8 illustrates an exemplary system 800 that may implement, at least in part, the technologies described herein. The computer system 800 includes one or more processors, such as processor 804. Processor 804 can be a special-purpose processor or a general-purpose processor. Processor 804 is connected to a communication infrastructure 802 (for example, a bus or a network). Depending upon the context, the computer system 800 may also be called a client device.

Computer system 800 also includes a main memory 806, preferably Random Access Memory (RAM), containing possibly inter alia computer software and/or data 808.

Computer system 800 may also include a secondary memory 810. Secondary memory 810 may include, for example, a hard disk drive 812, a removable storage drive 814, a memory stick, etc. A removable storage drive 814 may comprise a floppy disk drive, a magnetic tape drive, an optical disk drive, a flash memory, or the like. A removable storage drive 814 reads from and/or writes to a removable storage unit 816 in a well-known manner. A removable storage unit 816 may comprise a floppy disk, a magnetic tape, an optical disk, etc. which is read by and written to by removable storage drive 814. As will be appreciated by persons skilled in the relevant art(s) removable storage unit 816 includes a computer usable storage medium 818 having stored therein possibly inter alia computer software and/or data 820.

In alternative implementations, secondary memory 810 may include other similar means for allowing computer programs or other instructions to be loaded into computer system 800. Such means may include, for example, a removable storage unit 824 and an interface 822. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 824 and interfaces 822 which allow software and data to be transferred from the removable storage unit 824 to computer system 800.

Computer system 800 may also include an input interface 826 and a range of input devices 828 such as, possibly inter alia, a keyboard, a mouse, etc.

Computer system 800 may also include an output interface 830 and a range of output devices 832 such as, possibly inter alia, a display, one or more speakers, etc.

Computer system 800 may also include a communications interface 834. Communications interface 834 allows software and/or data 838 to be transferred between computer system 800 and external devices. Communications interface 834 may include a modem, a network interface (such as an Ethernet card), a communications port, a Personal Computer Memory Card International Association (PCMCIA) slot and card, or the like. Software and/or data 838 transferred via communications interface 834 are in the form of signals 836 which may be electronic, electromagnetic, optical, or other signals capable of being received by communications 834. These signals 836 are provided to communications interface 834 via a communications path 840. Communications path 840 carries signals and may be implemented using a wire or cable, fiber optics, a phone line, a cellular phone link, a Radio Frequency (RF) link or other communication channels.

As used in this document, the terms "computer-program medium," "computer-usable medium," and "computer-readable medium" generally refer to media such as removable storage unit 816, removable storage unit 824, and a hard disk installed in hard disk drive 812. Computer program medium and computer usable medium can also refer to memories, such as main memory 806 and secondary memory 810, which can be memory semiconductors (e.g., Dynamic Random Access Memory (DRAM) elements, etc.). These computer program products are means for providing software to computer system 800.

Computer programs (also called computer control logic) are stored in main memory 806 and/or secondary memory 810. Such computer programs, when executed, enable computer system 800 to implement the present technology described herein. In particular, the computer programs, when executed, enable processor 804 to implement the processes of aspects of the above. Accordingly, such computer programs represent controllers of the computer system 800. Where the technology described herein is implemented, at least in part, using software, the software may be stored in a computer program product and loaded into computer system 800 using removable storage drive 814, interface 822, hard disk drive 812 or communications interface 834.

The technology described herein may be implemented as computer program products comprising software stored on any computer useable medium. Such software, when executed in one or more data processing devices, causes data processing device(s) to operate as described herein. Embodiments of the technology described herein may employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), and nanotechnological storage device, etc.).

A computing system may take the form of any combination of one or more of inter alia a wired device, a wireless device, a mobile phone, a feature phone, a smartphone, a tablet computer (such as for example an iPad™), a mobile computer, a handheld computer, a desktop computer, a laptop computer, a server computer, an in-vehicle (e.g., audio, navigation, etc.) device, an in-appliance device, a Personal Digital Assistant (PDA), a game console, a Digital Video Recorder (DVR) or Personal Video Recorder (PVR), a cable system or other set-top-box, an entertainment system component such as a television set, etc.

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

One or more embodiments described herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

What is claimed is:

1. A method of updating component code of web pages, comprising:
    invoking an automatic componentization engine (ACE) crawler to determine changes in the component code of the web pages, wherein the ACE crawler runs a script to explore and navigate through the web pages;
    identifying, by an automatic componentization engine (ACE) browser, elements having corresponding component code and sending the elements and associated web pages to an automatic componentization engine (ACE) server;
    parsing, by the ACE server, the component code and transforming the parsed component code to source code for each of the web pages; and
    sending the source code to a job initializer, the job initializer for automatic run time of computer code, wherein the job initializer performs a build by compiling the source code with the received changes, verifies the build, and sends a notification of the build to users of the web pages.

2. The method of claim 1, wherein the invoking is part of a schedule event or command.

3. The method of claim 1, wherein the compiling is to a specific branch of a main branch of source code.

4. The method of claim 1, further comprising merging the code to a main branch of source code in response to a successful build from verifying the build.

5. The method of claim 1, wherein the sending the notification is performed via an email message to a component owner.

6. A device comprising:
one or more processors; and
memory coupled to the one or more processors configured to
 invoke an automatic componentization engine (ACE) crawler to determine changes in the component code of the web pages, wherein the ACE crawler runs a script to explore and navigate through the web pages,
 identify, by an automatic componentization engine (ACE) browser, elements having corresponding component code and sending the elements and associated web pages to an automatic componentization engine (ACE) server
 parse, by the ACE server, the component code and transform the parsed component code to source code for each of the web pages; and
 send the source code to a job initializer, the job initializer for automatic run time of computer code, wherein the job initializer performs a build by compiling the source code with the received changes, verifies the build, and sends a notification of the build to users of the web pages.

7. The device of claim 6, wherein the component code is generated by a separate device that receives the code changes, and provides the component code to the device.

8. The device of claim 6, wherein the verify the compile build includes merging the compiled code with a main branch of source code in response to the build being successful.

9. The device of claim 6, wherein the verify the build includes calling for manual intervention in response to the build being not successful.

10. The device of claim 6, wherein the notification is sent to an owner of modules for the code.

11. One or more non-transitory computer-readable media storing processor-executable instructions that when executed cause one or more processors to perform operations that update code, comprising:
 initiating an automatic componentization engine (ACE) crawler to explore and navigate through a web page to determine changes in component code of elements that make up the web page;
 identifying, by an automatic componentization engine (ACE) browser, elements having corresponding component code and sending the elements and associated web pages to an automatic componentization engine (ACE) server
 parsing, by the ACE server, the component code and transforming the parsed component code to source code for each of the web pages; and
 sending the source code to a job initializer, the job initializer for automatic run time of computer code, wherein the job initializer performs a build by compiling the source code with the received changes, verifies the build, and sends a notification of the build to users of the web pages.

12. The one or more computer-readable media of claim 11, wherein the initiating is performed automatically.

13. The one or more computer-readable media of claim 11, wherein the compiling is for a specific branch of a main branch of the source code.

14. The one or more computer-readable media of claim 11, wherein the verifying includes merging the compiled code to a main source code branch in response to the verifying the build being successful.

15. The one or more computer-readable media of claim 11, wherein sending the notification includes providing revised code.

* * * * *